UNITED STATES PATENT OFFICE.

JOHN ALLEN HEANY, OF PHILADELPHIA, PENNSYLVANIA, ASSIGNOR TO THE TETER-HEANY DEVELOPING COMPANY, OF PHILADELPHIA, PENNSYLVANIA, AND CHARLESTON, WEST VIRGINIA, A CORPORATION OF WEST VIRGINIA.

METHOD OF INSULATING METALLIC SURFACES WITH ASBESTOS.

SPECIFICATION forming part of Letters Patent No. 703,201, dated June 24, 1902.

Original application filed November 9, 1901, Serial No. 81,729. Divided and this application filed January 9, 1902. Serial No. 88,972. (No specimens.)

*To all whom it may concern:*

Be it known that I, JOHN ALLEN HEANY, a citizen of the United States, residing at the city of Philadelphia, in the county of Philadelphia and State of Pennsylvania, have invented certain new and useful Improvements in Methods of Insulating Metallic Surfaces with Asbestos, of which the following is a specification.

My invention has relation to the insulation of electric wires or other metallic surfaces by means of a compound containing asbestos, and is a division of my application filed November 9, A. D. 1901, under the Serial No. 81,729.

Heretofore the use of asbestos as an insulating material has been limited by reason of the fact that it could not be applied to the metal in a thin pliable form and yet be made waterproof, fireproof, and adhesive under conditions of excessive heat applied through the metallic surface or extraneously applied to the asbestos covering. As is well known, asbestos is an absorbent of moisture and is not absolutely fireproof, because if exposed to a Bunsen flame the fiber of asbestos loses its flexibility and becomes exceedingly brittle by reason of the driving off of the water of crystallization. When so heated, a chemical change in the asbestos results in its deterioration as an insulating material, the asbestos being converted into oxids and the fiber made brittle.

The principal object of my present invention is to provide a method whereby asbestos may be applied to electric wires or metallic surfaces so that it shall be fireproof, waterproof, and sufficiently thin, pliable, and adhesive to permit the wire or surface to be bent into helices or coils without impairing the efficiency of the asbestos as an insulating covering.

In carrying out my invention the metallic wire or surface is first coated or covered with a paste or cement containing the following ingredients, to wit: first composition—fish-glue or gelatinous or albuminous substances in substantially equal proportions of each, with water to make a thin solution, and this thin solution is combined with lime, either wholly or partly slaked, until it becomes of a doughy consistency; second solution—sulfate of ammonia, two ounces; boracic acid, one ounce; sulfate of soda, two ounces; chlorid of ammonia, one ounce; chlorid of soda, one ounce, and water, twenty-five ounces. After either the first composition or the second solution has been applied to the metallic wire or surface the asbestos, first treated with the second solution, containing the chemical or metallic salts, as above set forth, is then dried and priked into flaky or fibrous form and then twisted under pressure upon the coated and sticky wire or metallic surface previously coated with either the said first composition or second solution. The asbestos covering thus applied may then be covered or coated with a paste or cement containing the first composition of lime with the albuminous or gelatinous material mixed with the solution of chemical or metallic salts as above set forth and, if desired, is again pressed down upon the wire or metallic surface. The coating or covering thus applied to the metallic wire or surface will be found to be a perfect insulation, water and fire proof, thin, pliable, and flexible, and adhering to the wire or metallic surface under extraordinary conditions of temperature.

If desired, and in some instances this is preferable, the wire or metallic surface before it is covered with the paste or cement in the first instance may be treated or immersed in a bath of zinc chlorid, which chlorid is allowed to dry upon the wire or surface before the first composition, containing lime and albuminous or gelatinous substances, combined with the second solution of chemical or metallic salts are applied to the wire. The zinc chlorid in this instance serves not only to clean the wire or metal surface, but when the wire or surface is subjected to extreme heat after the insulation has been applied the chlorin is driven off, and metallic zinc remaining will chemically combine with the metal and with certain of the ingredients of the paste or cement. The adhesion of the asbestos to the metal wire or surface is thus increased.

Having thus described the nature and object of my invention, what I claim as new, and desire to secure by Letters Patent, is—

1. The method of insulating metallic surfaces with asbestos, which consists in first applying to the metallic surface a paste or cement, second, in embedding asbestos in fibrous or flaky form in said cement, and finally covering the asbestos with a solution of chemical or metallic salts combined with a gluey or albuminous substance containing lime.

2. The method of insulating metallic surfaces with asbestos, which consists in first impregnating the asbestos with a solution of chemical or metallic salts, second, reducing the impregnated asbestos to flaky or fibrous form, third, applying an adhesive paste or cement to the metallic surface, fourth, applying the asbestos to the adhesive metallic surface, and finally coating the asbestos thus applied with a solution of chemical or metallic salts combined with an albuminous or gelatinous substance containing lime.

3. The method of insulating metallic surfaces with asbestos, which consists in first coating the metallic surface with an albuminous or gelatinous substance containing lime in a solution of chemical or metallic salts, second, applying and compressing asbestos in fibrous or flaky form onto said surface, third, coating the asbestos-covered metallic surface with a fire and water proof paste or cement, and finally compressing the coated fibrous or flaky asbestos on said metallic surface.

4. The method of insulating metallic surfaces with asbestos, which consists in applying directly to the metallic surface to be insulated a paste of lime combined with a gelatinous or albuminous solution, then applying and compressing asbestos in fibrous or flaky form into the paste applied to said surface, then coating the asbestos-covered surface with metallic or chemical salts and finally compressing the coated fibrous or flaky asbestos onto said metallic surface.

5. The method of insulating metallic surfaces with asbestos, which consists in first applying to the metallic surface to be insulated a paste consisting of an albuminous or gelatinous solution combined with lime and with metallic or chemical salts, then applying flaky or fibrous asbestos to said paste, and finally compressing the asbestos upon the metallic surface.

6. The method of insulating metallic surfaces with asbestos, which consists in first applying to the metallic surface to be insulated a paste consisting of an albuminous or gelatinous solution combined with lime, second, embedding flaky or fibrous asbestos in said paste, and finally applying to the asbestos a fire and water proof paste or cement.

In testimony whereof I have hereunto set my signature in the presence of two subscribing witnesses.

JOHN ALLEN HEANY.

Witnesses:
J. WALTER DOUGLASS,
THOMAS M. SMITH.